United States Patent
Fujimura et al.

(10) Patent No.: US 8,827,608 B2
(45) Date of Patent: Sep. 9, 2014

(54) TOOL TIGHT-CONTACT-STATE DETECTOR FOR MACHINE TOOL

(75) Inventors: Noritaka Fujimura, Ritto (JP); Kenichiro Hirao, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1014 days.

(21) Appl. No.: 12/935,533

(22) PCT Filed: Jan. 20, 2009

(86) PCT No.: PCT/JP2009/050704
§ 371 (c)(1),
(2), (4) Date: Dec. 16, 2010

(87) PCT Pub. No.: WO2009/122763
PCT Pub. Date: Oct. 8, 2009

(65) Prior Publication Data
US 2011/0121521 A1   May 26, 2011

(30) Foreign Application Priority Data
Mar. 31, 2008  (JP) .................................. 2008-089531

(51) Int. Cl.
*B23Q 17/22* (2006.01)
*B23Q 17/00* (2006.01)

(52) U.S. Cl.
CPC .................................. *B23Q 17/005* (2013.01)
USPC ........... 409/193; 409/194; 409/231; 279/4.02

(58) Field of Classification Search
CPC .... B23C 9/00; B23Q 11/005; B23Q 11/0078; B23Q 11/0085; B23Q 11/0082; B23Q 11/089; B23Q 15/20; B23Q 16/00; B23Q 17/002; B23Q 17/003; B23Q 17/005; B23Q 17/006; B23Q 17/22; B23Q 17/2216
USPC ........... 409/134, 137, 193, 194, 231; 269/22; 279/126, 4.02
See application file for complete search history.

(56) References Cited

U.S. PATENT DOCUMENTS

| 4,504,824 | A | | 3/1985 | Mello |
| 5,002,442 | A | * | 3/1991 | Rutschle ....................... 409/134 |

FOREIGN PATENT DOCUMENTS

| EP | 0 298 239 A2 | 1/1989 |
| JP | 6-5851 U | 1/1994 |

(Continued)

OTHER PUBLICATIONS

Supplementary European Search Report dated Nov. 16, 2011.

*Primary Examiner* — Andrea Wellington
*Assistant Examiner* — Alan Snyder
(74) *Attorney, Agent, or Firm* — Birch, Stewart, Kolasch & Birch, LLP

(57) ABSTRACT

Provided is a tool tight-contact-state detector for a machine tool which is capable of accurately and stably detecting whether or not a tool or a tool holder having the tool attached thereto is mounted to a main spindle in tight contact therewith. While rotation of a main spindle (13) is stopped, hydraulic pressure is supplied from a hydraulic pressure supply unit (28) to a cylinder section (20) so as to bring a piston member (21) to into contact with a main spindle head (11) and the main spindle (13) against a biasing force from an O-ring (22). Air is thereby allowed to be supplied to air ejection holes (27a, 27b, 27c), which are formed in a forward end face (13a) of the main spindle (13), from the main spindle head (11) side through the piston member (21). Then, a judgment is made as to whether or not an end face (41) of a tool (2) and a forward end face (13a) of the main spindle (13) are in tight contact therewith, on the basis of detection by air pressure detection sensors (25a, 25b, 25c) regarding pressure variations in the air injected from the air ejection holes (27a, 27b, 27c).

7 Claims, 3 Drawing Sheets

(56) References Cited

FOREIGN PATENT DOCUMENTS

| JP | 10-225845 A | 8/1998 |
| JP | 2001-259906 A | 9/2001 |
| JP | 2002-103183 A | 4/2002 |
| JP | 2005-103735 A | 4/2005 |
| JP | 2007-90514 A | 4/2007 |
| JP | 2008-55522 A | 3/2008 |

* cited by examiner

TOOL TIGHT-CONTACT-STATE DETECTOR FOR MACHINE TOOL

TECHNICAL FIELD

The present invention relates to a tool tight-contact-state detector for a machine tool, the tool tight-contact-state detector detecting whether or not a tool or a tool holder having a tool attached thereto is mounted to a main spindle in tight contact therewith.

BACKGROUND ART

There have been widely used machine tools which perform machining while performing automatic tool replacement between a tool magazine and a main spindle. In such machine tools, swarf produced during machining may attach to a tapered portion of a tool or of a tool holder having a tool attached thereto and/or to a main spindle's seating face on which the tapered portion is seated. When machining is performed with the tool or the tool holder mounted to the main spindle while such swarf exists between the tapered portion and the seating face, the tapered portion may not come in proper tight contact with the seating face of the main spindle. The tool is therefore not precisely positioned. This may adversely affect the machining accuracy and, in some cases, damage the tool and/or the main spindle.

To solve this, conventional machine tools are provided with a tool tight-contact-state detector which detects whether or not a tool or a tool holder is mounted to a main spindle in tight contact therewith. Examples of such tool tight-contact-state detector for a machine tool are disclosed in Patent Documents 1 and 2.

Patent Document 1: Japanese Patent Application Publication No. Hei 10-225845
Patent Document 2: Japanese Patent Application Publication No. 2001-259906

DISCLOSURE OF THE INVENTION

Problems to be Solved by the Invention

In the above-described conventional tool tight-contact-state detectors, air for checking the tight contact state is ejected through a seating face of a main spindle when a tapered portion of a tool or of a tool holder is mounted on the seating face. Then, on the basis of detection of variations in the pressure of the air, a judgment is made as to whether or not the tool or the tool holder is mounted to the main spindle in tight contact therewith.

However, according to the configuration in Patent Document 1, the air for checking the tight contact state is supplied to the inside of the main spindle through a rotary joint. Accordingly, a slide portion between the rotary joint, which is fixed, and the main spindle, which is rotated, wears down, leading to occurrence of air leak. This makes it difficult to stably supply air to the seating face of the main spindle. Therefore, especially when minute swarf is involved, there is a possibility that accurate detection may not be performed.

Also, according to the configuration in Patent Document 2, a spool is provided between an air passage on a housing side and an air passage on a main spindle side in such a manner as to be slidable in the radial direction. Supplied air for checking the tight contact state moves the spool against a biasing force from a spring, thereby causing the air passages on both sides to communicate with each other. This, however, requires the air pressure to be set to a level high enough to move the spool against the biasing force from the spring. Thus, the air pressure needs to be set higher than necessary.

The present invention has been made to solve the above-described problems, and thus an object thereof is to provide a tool tight-contact-state detector for a machine tool which is capable of accurately and stably detecting whether or not a tool or a tool holder having the tool attached thereto is mounted to a main spindle in tight contact therewith.

Means for Solving the Problems

A tool tight-contact-state detector for a machine tool according to a invention for solving the above-described problems is characterized by comprising: a main spindle which is supported rotatably by a main spindle head and has a seating face on which any one of a tool for performing a certain machining on a machining target and a tool holder having the tool attached thereto is to be detachably mounted; a cylinder section which is formed in the main spindle head and in which a piston member is housed slidably; elastic means for biasing the piston member; fluid supplying means for supplying fluid to the cylinder section, thereby bringing the piston member into contact with the main spindle head and the main spindle against a biasing force from the elastic means, while rotation of the main spindle is stopped; gas supplying means for supplying gas to the main spindle from the main spindle head through the piston member, when the fluid supplying means supplies the fluid to the cylinder section thereby bringing the piston member into contact with the main spindle head and the main spindle against the biasing force from the elastic means; a plurality of gas ejection holes which are formed in the seating face and eject the gas supplied from the gas supplying means; and tool tight-contact-state judging means for judging whether or not the any one of the tool and the tool holder is in tight contact with the seating face by detecting a gas pressure of the gas ejected from the gas ejection holes when the any one of the tool and the tool holder is mounted to the seating face.

The tool tight-contact-state detector for a machine tool according to a second invention for solving the above-described problems is characterized in that the piston member formed in a ring shape is housed inside the cylinder section formed in such an annular shape as to surround the main spindle.

The tool tight-contact-state detector for a machine tool according to a third invention for solving the above-described problems is characterized in that the gas supplying means includes a main spindle head-side gas passage to which the gas is supplied, a main spindle-side gas passage which is formed in the main spindle and connected to the gas ejection holes, and a piston-side gas passage which is formed in the piston member and allows the main spindle head-side gas passage and the main spindle-side gas passage to communicate with each other.

The tool tight-contact-state detector for a machine tool according to a fourth invention for solving the above-described problems is characterized in that the fluid supplying means includes a fluid reservoir which is formed in such an annular shape as to surround the main spindle and to which the fluid is supplied, and a fluid passage which is connected to and between the fluid reservoir and the cylinder section.

The tool tight-contact-state detector for a machine tool according to a fifth invention for solving the above-described problems is characterized in that the fluid supplying means and the gas supplying means are provided in the same phase in a circumferential direction of the main spindle.

The tool tight-contact-state detector for a machine tool according to a sixth invention for solving the above-described problems is characterized in that the fluid supplying means is provided outward of the gas supplying means in a radial direction of the main spindle.

The tool tight-contact-state detector for a machine tool according to a seventh invention for solving the above-described problems is characterized in that the gas ejection holes are formed at equal angular intervals in a circumferential direction of the main spindle.

Effects of the Invention

Thus, in the tool tight-contact-state detector for a machine tool according to the present invention, the gas supplying means for supplying the gas to the gas ejection holes can be provided in a non-contact state between the main spindle head and the main spindle during rotation of the main spindle. Accordingly, the gas supplying means can be prevented from wearing down. This, as a result, allows the gas to be stably supplied without any gas leak when the gas is supplied from the gas supplying means after the rotation of the main spindle is stopped. It is therefore possible to accurately detect whether or not the tool or the tool holder is mounted to the main spindle in tight contact therewith. Moreover, since the main spindle is less processed, the rigidity of the main spindle can be increased. Furthermore, since the cylinder section in which the piston member slides is provided inside the main spindle head, attachment to the main spindle head or an outer portion of the main spindle is not needed, whereby the design freedom of the tool or the tool holder can be improved.

BEST MODES FOR CARRYING OUT THE INVENTION

Figure 1:
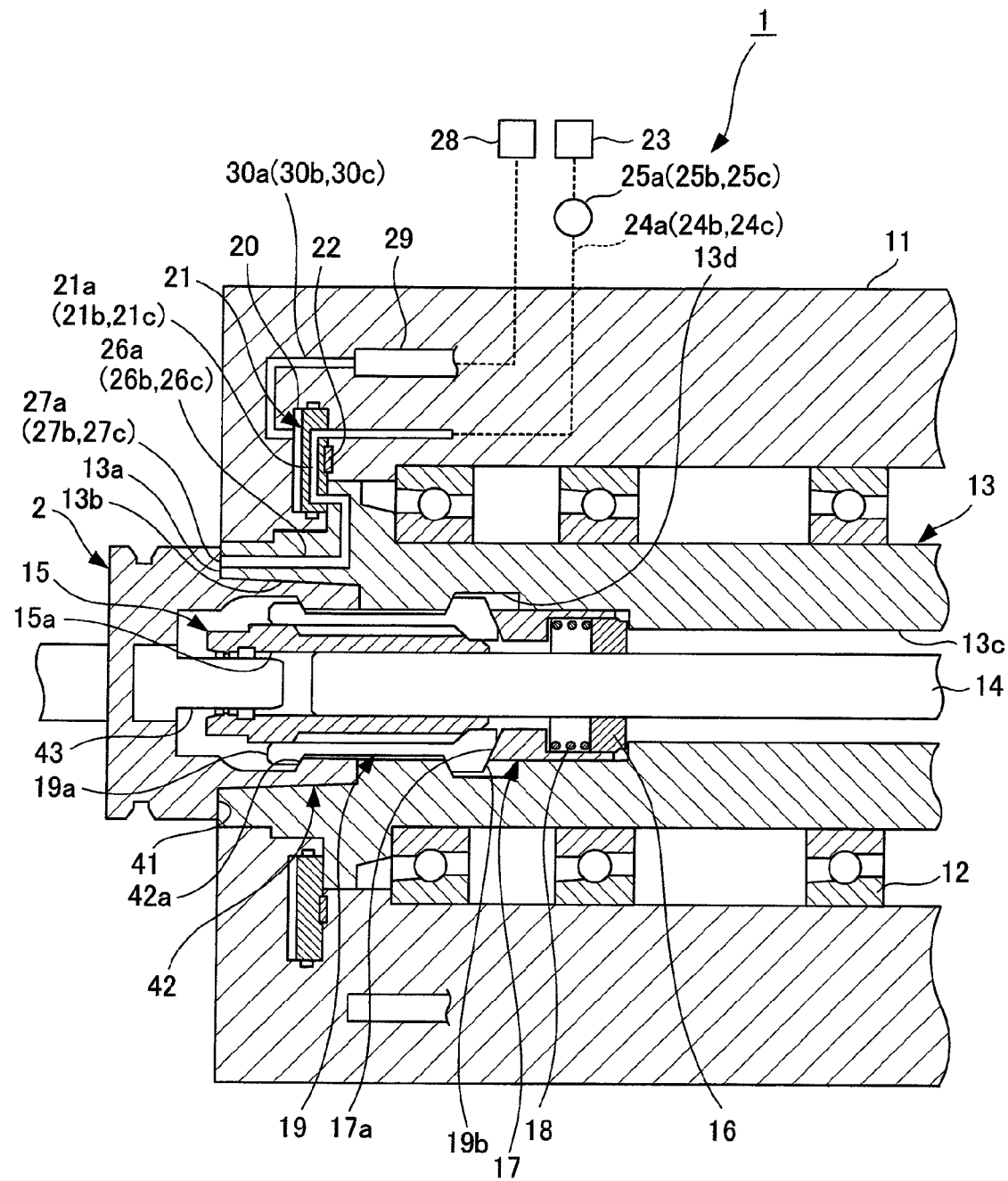
FIG. 1 is a cross-sectional view of a forward end side of a main spindle device of a machine tool including a tool tight-contact-state detector according to an embodiment of the present invention.
Figure 2:
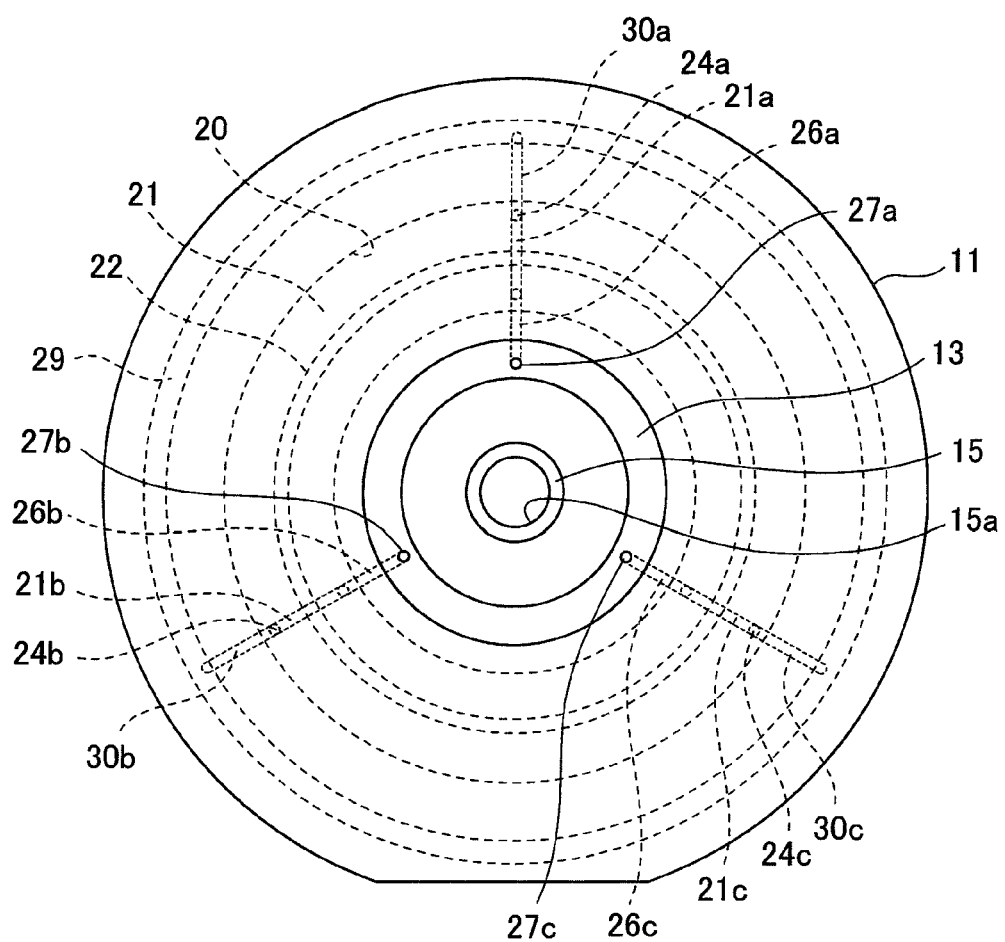
FIG. 2 is a front view of a main spindle head.
Figure 3:
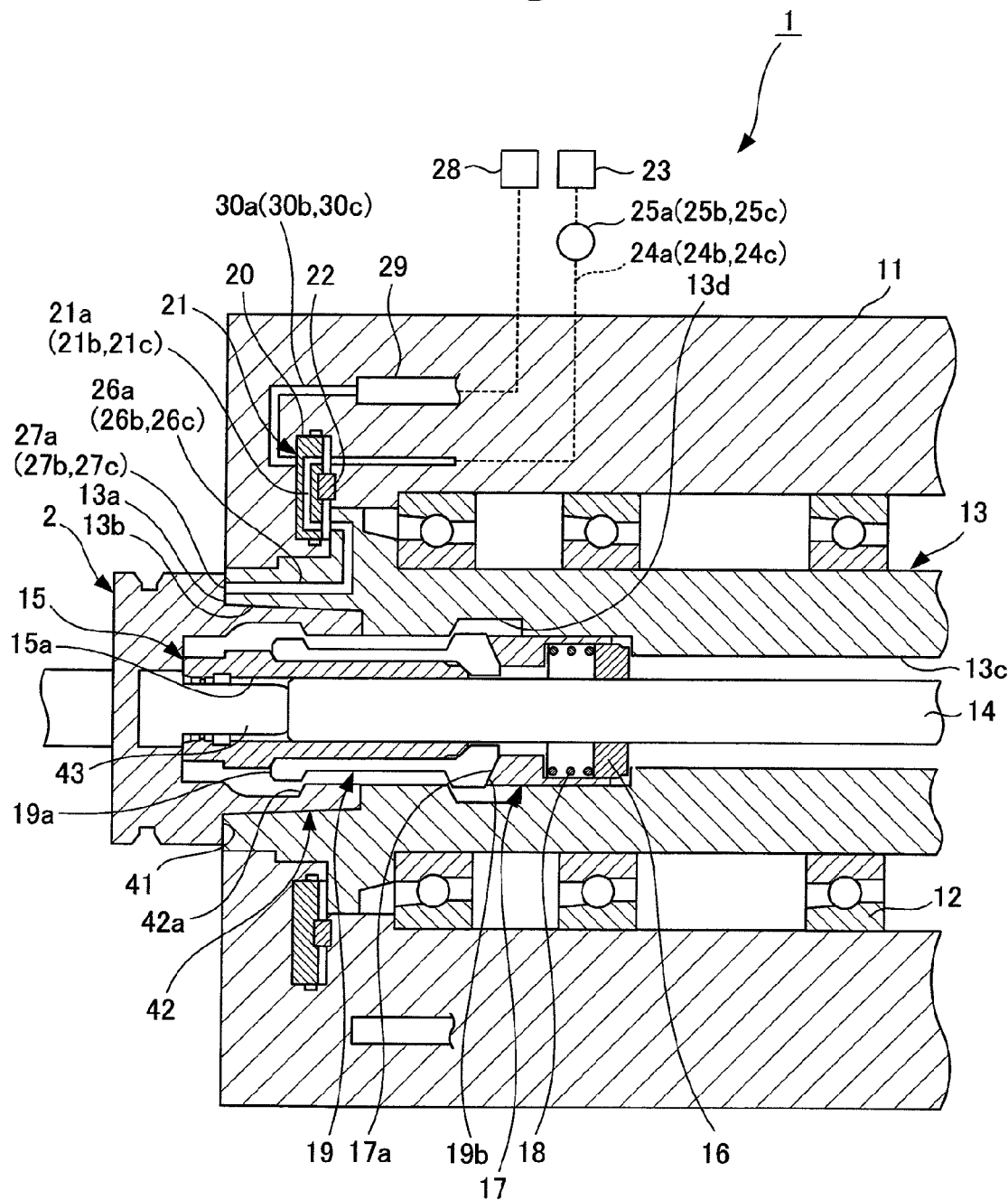
FIG. 3 is a view showing a state where a tool is unclamped.

Hereinbelow, a tool tight-contact-state detector for a machine tool according to the present invention will be described in detail by using the drawings. FIG. 1 is a cross-sectional view of a forward end side of a main spindle device of a machine tool including a tool tight-contact-state detector according to an embodiment of the present invention. FIG. 2 is a front view of a main spindle head. FIG. 3 is a view showing a state where a tool is unclamped.

A main spindle device 1 for a machine tool shown in FIG. 1 is a device to which a tool 2 for performing a certain machining on an unillustrated work (machining target) is attachably and detachably mounted.

As shown in FIGS. 1 and 2, the main spindle device 1 includes a cylindrical main spindle head 11. The main spindle head 11 includes a main spindle 13 rotatably supported therein with multiple bearings 12 in between. The main spindle 13 includes a tapered hole (seating face) 13b and a spindle hole 13c which are formed continuously along an axial center of the main spindle 13. The tapered hole 13b is formed in such a manner that its inner diameter gradually becomes smaller toward the main spindle's rear end. The forward end of the tapered hole 13b is open at a forward end face (seating face) 13a whereas the rear end thereof communicates with the spindle hole 13c.

A rod 14 is supported in the spindle hole 13c of the main spindle 13 in such a manner as to be slidable in the axial direction. The rod 14 rotates together with the main spindle 13, and also is in a state of being biased toward the main spindle's rear end by unillustrated biasing means. An unillustrated hydraulic cylinder allows the rod 14 to move toward the main spindle's forward end against the biasing force.

A fitting member 15 is provided to the forward end of the rod 14, and a fitting hole 15a is formed in the forward end of the fitting member 15. Moreover, a support member 16 is provided to an outer circumferential portion of the rod 14. By the support member 16, a pressing member 17 is supported in such a manner as to be slidable in an axial direction of the main spindle 13. Also, a spring member 18 is interposed between the support member 16 and the pressing member 17 in a compressed state. That is, the pressing member 17 is in a state of being biased toward the main spindle's forward end.

A collet 19 is placed outward of the fitting member 15 in the radial direction thereof. An engaging portion 19a is formed at the forward end of the collet 19 whereas an inclined face 19b is formed at the rear end thereof. The rear end of the collet 19 is housed inside a housing portion 13d of the main spindle 13, and the inclined face 19b is capable of coming into sliding contact with an inclined face 17a formed at the forward end of the pressing member 17. That is, the collect 19 is slidable in the radial direction of the main spindle 13.

In addition, an annular cylinder section 20 is formed on a forward end side of the main spindle head 11. A ring-shaped piston member 21 is housed inside the cylinder section 20 in such a manner as to be slidable in the axial direction of the main spindle head 11 (main spindle 12). Air passages (piston-side gas passages) 21a, 21b, and 21c are formed in the piston member 21. The air passages 21a, 21b, and 21c extend respectively in radial directions of the piston member 21 and are provided at equal angular intervals in the circumferential direction thereof. Both ends of each of the air passages 21a, 21b, and 21c are open at an outer wall of the piston member 21 on the side closer to the main spindle's rear end. Also, an O-ring (elastic means) 22, which is an elastic body, is provided to an inner wall of the cylinder section 20 on the side closer to the main spindle's rear end in such a way as to be interposed between both ends of each of the air passages 21a, 21b, and 21c. That is, the piston member 21 is in a state of being biased toward the main spindle's forward end.

Air passages (main spindle head-side gas passages) 24a, 24b, and 24c communicate with the cylinder section 20 through an inner wall thereof on the side closer to the main spindle's rear end, the inner wall being located outward of the O-ring 22 in the radial direction thereof. The air passages 24a, 24b, and 24c each extend in the axial direction of the main spindle head 11 (main spindle 12) and are provided at equal angular intervals in the circumferential direction thereof. One end of each of the air passages 24a, 24b, and 24c is open in such a way as to face one end of the corresponding one of the air passages 21a, 21b, and 21c of the piston member 21. The other ends of the air passages 24a, 24b, and 24c are each connected to an air supply unit 23 that supplies air, and, in the middle therebetween, there are air pressure detection sensors 25a, 25b, and 25c, respectively, that detect air pressure.

Meanwhile, air ejection holes 27a, 27b, and 27c are formed in the forward end face 13a of the main spindle 13. The air ejection holes 27a, 27b, and 27c are open at equal angular intervals in the circumferential direction of the main spindle 13. The air ejection holes 27a, 27b, and 27c are connected to air passages (main spindle-side gas passages) 26a, 26b, and 26c extending respectively in radial directions of the main spindle 13. The air passages 26a, 26b, and 26c communicate with the cylinder section 20 through an inner wall thereof on the side closer to the main spindle's rear end, the inner wall being located inward of the O-ring 22 in the radial direction thereof. One ends of the air passages 26a, 26b, and 26c are open in such a way as to face the other end of the respective air passages 21a, 21b, and 21c of the piston member 21.

In addition, an annular oil reservoir (fluid reservoir) 29 is formed at a position outward of the cylinder section 20 in the radial direction thereof at a forward end side of the main spindle head 11. Hydraulic pressure passages (fluid passages) 30a, 30b, and 30c are connected to the main spindle's forward end side of the oil reservoir 29 whereas a hydraulic pressure supply unit 28 that supplies hydraulic pressure is connected to the main spindle's rear end side thereof. The hydraulic pressure passages 30a, 30b, and 30c extend respectively in radial directions of the main spindle head 11 (main spindle 12) and are provided at equal angular intervals in the circumferential direction thereof. In addition, the hydraulic pressure passages 30a, 30b, and 30c are provided in the same phase as that of the air ejection holes 27a, 27b, and 27c, respectively, and communicate with the cylinder section 20 through an inner wall thereof on the side closer to the main spindle's forward end.

Thus, by supplying hydraulic pressure from the hydraulic pressure supply unit 28 to the cylinder section 20 through the oil reservoir 29 and the hydraulic pressure passages 30a, 30b, and 30c while the rotation of the main spindle 13 is stopped, the piston member 21 is caused to move against the biasing force from the O-ring 22 toward the main spindle's rear end. Accordingly, the air passages 21a, 21b, and 21c come to communicate with the air passages 24a, 24b, and 24c and the air passages 26a, 26b, and 26c, respectively (see FIG. 1). As a result, air supplied from the air supply unit 23 is ejected from the air ejection holes 27a, 27b, and 27c through the air passages 21a, 21b, and 21c, the air passages 24a, 24b, and 24c, and the air passages 26a, 26b, 26c, respectively.

Also, by stopping the supply of the hydraulic pressure from the hydraulic pressure supply unit 28 while the main spindle 13 is rotating, the piston member 21 is caused to move toward the main spindle's forward end due to the biasing force from the O-ring 22. This separates the air passages 21a, 21b, and 21c from the air passages 24a, 24b, and 24c and the air passages 26a, 26b, and 26c, respectively (see FIG. 3). Since the air supply unit 23 is constantly driven during this event, the air is leaking from the air passages 24a, 24b, and 24c.

Note that the air passages 21a, 21b, and 21c, the air passages 24a, 24b, and 24c, the air passages 26a, 26b, and 26c, the air supply unit 23, the air ejection holes 27a, 27b, and 27c, and the like constitute gas supplying means, whereas the hydraulic pressure supply unit 28, the oil reservoir 29, the hydraulic pressure passages 30a, 30b, and 30c, and the like constitute fluid supplying means.

Meanwhile, as shown in FIG. 1, the tool 2 is of a double fit type and has an end face 41 and a tapered portion 42 as tight contact faces. The end face 41 is to be brought into tight contact with the forward end face 13a of the main spindle 13. In addition, the tapered portion 42 is to be brought into tight contact with the tapered hole 13b of the main spindle 13 and formed in such a manner that its out diameter gradually becomes smaller toward the spindle's rear end. A bump 42a is formed on an inner circumferential surface of the tapered portion 42 at a forward end thereof. The bump 42a is to engage with the engaging portion a of the collet 19. Also, a fitting shaft portion 43 is provided on a bottom portion inside the tapered portion 42. The fitting shaft portion 43 is to be fitted into the fitting hole 15a of the fitting member 15.

Thus, in replacement of the tool, after a machining on a work is finished, the rotation of the main spindle 13 is stopped, and the hydraulic cylinder moves the rod 14 toward the main spindle's forward end against the biasing force from the biasing means. Thereby, the fitting member 15 presses the fitting shaft portion 43 of the tool 2. Caused by this action, an inner wall of the housing portion 13c of the main spindle 13, the rear end of the fitting member 15, and the inclined face 17a of the pressing member 17 come to cooperate with each other, so that the collet 19 moves inward in the radial direction of the main spindle 13. This releases the engagement between the engaging portion 19a and the bump 42a of the tapered portion 42. As a result, the tool 2 is brought into an unclamped state with respect to the main spindle 13 as shown in FIG. 3. The tool 2 in such an unclamped state is then detached from the main spindle 13 and replaced with another tool 2.

Subsequently, the replaced tool 2 is transferred to the main spindle 13 by an automatic tool replacement unit. Then, after the fitting shaft portion 43 is fitted (mounted) into the fitting hole 15a of the fitting member 15, the tapered portion 42 of the tool 2 starts to be fitted (mounted) into the tapered hole 13b of the main spindle 13. The rod 14 is thereafter moved toward the main spindle's rear end by the biasing force from the biasing means. Caused by this action, the inner wall of the housing portion 13c of the main spindle 13, the rear end of the fitting member 15, and the inclined face 17a of the pressing member 17 cooperate with each other, so that the collet 19 moves outward in the radial direction of the main spindle 13. This causes the engaging portion 19a to engage with the bump 42a of the tapered portion 42. As a result, the tool 2 is pulled into and clamped to the main spindle 13 as shown in FIG. 1.

Here, during the tool replacement mentioned above, the hydraulic pressure supply unit 28 is being driven and thus hydraulic pressure is being supplied to the cylinder section 20 through the oil reservoir 29 and the hydraulic pressure passages 30a, 30b, and 30c. Accordingly, as shown in FIG. 1, the piston member 21 moves toward the main spindle's rear end against the biasing force from the O-ring 22. In the end, the piston member 21 elastically deforms the O-ring 22 and comes into tight contact with the inner wall of the cylinder section 20 on the side closer to the main spindle's rear end. As a result, the air passages 21a, 21b, and 21c are put into a state of communicating with the air passages 24a, 24b, and 24c and the air passages 26a, 26b, and 26c, respectively.

During this event, the air supply unit 23 is constantly driven. Thus, as soon as the air passages 21a, 21b, and 21c are brought into communication with the air passages 24a, 24b, and 24c and the air passages 26a, 26b, and 26c, respectively, air supplied from the air supply unit 23 is supplied to a forward end side of the main spindle 13 through the air passages 21a, 21b, and 21c, the air passages 24a, 24b, and 24c, and the air passages 26a, 26b, and 26c, and ejected from the air ejection holes 27a, 27b, and 27c.

Then, when the end face 41 of the tool 2 is mounted onto the forward end face 13a of the main spindle 13, the air, which has been ejected from the air ejection holes 27a, 27b, and 27c, becomes no longer capable of being ejected therefrom. Thereby, the air pressures inside the air passages 24a, 24b, and 24c rise. The air pressure detection sensors 25a, 25b, and 25c constantly detect the respective air pressures. Hence, upon detection that all the air pressures have reached a predetermined air pressure, the air pressure detection sensors 25a, 25b, and 25c respectively output signals regarding the detection. By this action, it is judged (tool tight-contact-state judging means) that the end face 41 and tapered portion 42 of the tool 2 are in tight contact with the forward end face 13a and the tapered hole 13b of the main spindle 13, respectively. Machining on the work is then resumed.

On the other hand, if foreign matter, such as swarf, has entered between the end face 41 and the forward end face 13a and/or between the tapered portion 42 and the tapered 13b during the tool replacement, the air ejected from the air ejection holes 27a, 27b, and 27c leaks from a gap between the end face 41 and the forward end face 13a. Accordingly, at least one of the air pressure detection sensors 25a, 25b, and 25c cannot detect the predetermined air pressure. Then, the air pressure detection sensors 25a, 25b, and 25c which could not detect the predetermined air pressure do not output detection signal. Thus, it is judged (tool tight-contact-sate judging means) that the end face 41 and the tapered portion 42 of the tool 2 are not in tight contact with the forward end face 13a and the tapered hole 13b of the main spindle 13. The machining on the work is then stopped.

Since the air supply unit 23 is constantly driven as mentioned above, air leaks from the air passages 24a, 24b, and 24c while the hydraulic pressure supply unit 28 is not driven. This not results in that foreign matter is prevented from entering the air supply unit 23 and the air passages 24a, 24b, and 25c, but also that foreign matter is prevented from entering the inside of the main spindle head 11 and of the main spindle 13 because the air thus leaking flows toward the main spindle's forward end from a gap between the main spindle head 11 and the main spindle 13. Furthermore, since the air supply unit 23 is constantly driven, the air supply unit 23 does not have to be driven every time the air pressure is to be detected. This shortens the time required for raising the air pressures and thus shortens the time required for the air pressure detection sensors 25a, 25b, and 25c to detect the air pressure.

It should be noted that, in the embodiment mentioned above, the tool tight-contact-state detector according the present invention is applied to the main spindle device 1 in which the tool 2 is directly mounted to the main spindle 13; however, the tool tight-contact-state detector can also be applied to a main spindle device in which a tool holder having a tool attached thereto is mounted to a main spindle. In addition, likewise, the air ejection holes 27a, 27b, and 27c which eject air are formed in the forward end face 13a of the main spindle 13; however, the air ejection holes 27a, 27b, and 27c may be formed in the tapered hole 13b which also serves as a seating face. Moreover, four or more air ejection holes may be provided. Furthermore, although the air pressure detection sensors 25a, 25b, and 25c are provided to the respective air passages 24a, 24b, and 24c branching off from the air supply unit 23, a single air pressure detection sensor may be provided to an air passage before branching off.

Accordingly, in the tool tight-contact--state detector for a machine tool according to the present invention, the piston member 21 moves away by the biasing force from the O-ring 22 while the main spindle 13 is rotating. The piston member 21 is hence contactless with the main spindle 13, therefore does not wear down. Thus, air is unlikely to leak during the time of supplying air after the rotation of the main spindle 13 is stopped, even when the hydraulic pressure supply unit 28 brings the piston member 21 into contact with the main spindle head 11 and the main spindle 13, thereby causing the air passages 21a, 21b, and 21c to communicate with the air passages 24a, 24b, and 24c and the air passages 26a, 26b, and 26c, respectively. As a result, air can be stably supplied to the air ejection holes 27a, 27b, and 27c; therefore, it is possible to accurately and stably detect whether or not the tool 2 is mounted to the main spindle 13 in tight contact therewith. In addition, the tight contact state detection (judgment) can be done within the time period from the mounting of a next tool 2 until completion of the tool replacement operation. Therefore, the detection can be done within an existing tool replacement time period. Moreover, since the structure of the whole detector is concentrated on a forward end side of the main spindle 13, maintenance can be performed easily.

Industrial Applicability

The present invention is applicable to a machine tool's main spindle device whose tool or tool holder having a tool attached thereto can be prevented from falling off or loosening.

The invention claimed is:

1. A tool tight-contact-state detector for a machine tool, characterized by comprising:
    a main spindle which is supported rotatably by a main spindle head and has a seating face on which any one of a tool for performing a certain machining on a machining target and a tool holder having the tool attached thereto is to be detachably mounted;
    a cylinder section which is formed in the main spindle head and in which a piston member is housed slidably;
    elastic means for biasing the piston member;
    fluid supplying means for supplying fluid to the cylinder section, thereby bringing the piston member into contact with the main spindle head and the main spindle against a biasing force from the elastic means, while rotation of the main spindle is stopped;
    gas supplying means for supplying gas to the main spindle from the main spindle head through the piston member, when the fluid supplying means supplies the fluid to the cylinder section thereby bringing the piston member into contact with the main spindle head and the main spindle against the biasing force from the elastic means;
    a plurality of gas ejection holes which are formed in the seating face and eject the gas supplied from the gas supplying means; and
    tool tight-contact-state judging means for judging whether or not the any one of the tool and the tool holder is in tight contact with the seating face by detecting a gas pressure of the gas ejected from the gas ejection holes when the any one of the tool and the tool holder is mounted to the seating face.

2. The tool tight-contact-state detector for a machine tool according to claim 1, characterized in that the piston member formed in a ring shape is housed inside the cylinder section formed in such an annular shape as to surround the main spindle.

3. The tool tight-contact-state detector for a machine tool according to claim 1, characterized in that
    the gas supplying means includes
        a main spindle head-side gas passage to which the gas is supplied,
        a main spindle-side gas passage which is formed in the main spindle and connected to the gas ejection holes, and
        a piston-side gas passage which is formed in the piston member and allows the main spindle head-side gas passage and the main spindle-side gas passage to communicate with each other.

4. The tool tight-contact-state detector for a machine tool according to claim 1, characterized in that
    the fluid supplying means includes
        a fluid reservoir which is formed in such an annular shape as to surround the main spindle and to which the fluid is supplied, and
        a fluid passage which is connected to and between the fluid reservoir and the cylinder section.

5. The tool tight-contact-state detector for a machine tool according to claim 1, characterized in that the fluid supplying means and the gas supplying means are provided in the same phase in a circumferential direction of the main spindle.

6. The tool tight-contact-state detector for a machine tool according to claim 1, characterized in that the fluid supplying means is provided outward of the gas supplying means in a radial direction of the main spindle.

7. The tool tight-contact-state detector for a machine tool according to claim 1, characterized in that the gas ejection holes are formed at equal angular intervals in a circumferential direction of the main spindle.

\* \* \* \* \*